(12) United States Patent
Colletti et al.

(10) Patent No.: US 12,071,244 B2
(45) Date of Patent: Aug. 27, 2024

(54) RECONFIGURABLE SEAT ASSEMBLY

(71) Applicant: THE BOEING COMPANY, Chicago, IL (US)

(72) Inventors: Brian Paul Colletti, Mission Viejo, CA (US); Kenneth Y. Lau, Orange, CA (US); Lihan Woo, Cerritos, CA (US)

(73) Assignee: The Boeing Company, Chicago, IL (US)

(*) Notice: Subject to any disclaimer, the term of this patent is extended or adjusted under 35 U.S.C. 154(b) by 132 days.

(21) Appl. No.: 17/965,931

(22) Filed: Oct. 14, 2022

(65) Prior Publication Data

US 2023/0182904 A1  Jun. 15, 2023

Related U.S. Application Data

(60) Provisional application No. 63/289,681, filed on Dec. 15, 2021.

(51) Int. Cl.
*B60N 2/75* (2018.01)
*B64D 11/06* (2006.01)
*B60N 2/30* (2006.01)
*B60R 5/04* (2006.01)

(52) U.S. Cl.
CPC ........ *B64D 11/064* (2014.12); *B64D 11/0636* (2014.12); *B64D 11/0644* (2014.12); *B64D 11/0647* (2014.12); *B60N 2/3002* (2013.01); *B60N 2/75* (2018.02); *B60R 5/044* (2013.01)

(58) Field of Classification Search
CPC ........ B60N 2/75–797; B60N 2/80–897; B60N 2/3002; B60N 2/3004; B60N 2/3006; B60N 2/309; B60N 2/3011; B60N 2/30; B64D 11/064; B64D 11/0636; B64D 11/0644; B64D 11/0647; B60R 5/044; B60R 5/042; B60R 5/041
See application file for complete search history.

(56) References Cited

U.S. PATENT DOCUMENTS

| 5,290,092 A | * | 3/1994 | Geer | B60N 2/793 297/411.32 |
| 6,648,392 B2 | | 11/2003 | Faurecia | |
| 7,036,884 B2 | * | 5/2006 | Becker | B60N 2/36 297/235 |
| 7,311,356 B2 | * | 12/2007 | Pudney | B60R 7/043 297/188.21 |
| 8,585,146 B1 | | 11/2013 | Giasson | |
| 9,764,667 B2 | * | 9/2017 | Wagner | B60N 2/859 |

(Continued)

FOREIGN PATENT DOCUMENTS

EP  3222523  9/2017

OTHER PUBLICATIONS

Extended European Search Report for EP 22213767.1-1004, dated Apr. 11, 2023.

*Primary Examiner* — Syed A Islam
(74) *Attorney, Agent, or Firm* — Joseph M. Butscher; The Small Patent Law Group LLC

(57) ABSTRACT

A seat assembly for an internal cabin of a vehicle includes a seat cushion, and a backrest pivotally coupled to the seat cushion. The backrest is moveable between a first position and a second position. The first position is configured to allow a passenger to sit on the seat cushion. The second position is configured to allow one or more cargo items to be secured on a rear surface of the backrest.

20 Claims, 11 Drawing Sheets

(56) References Cited

U.S. PATENT DOCUMENTS

| | | | |
|---|---|---|---|
| 9,975,491 B2* | 5/2018 | Morlet Ugalde | ....... B60R 5/047 |
| 2014/0183920 A1 | 7/2014 | Hage-Hassan | |
| 2015/0298812 A1 | 10/2015 | Jasny | |
| 2021/0188535 A1 | 6/2021 | Grip | |

* cited by examiner

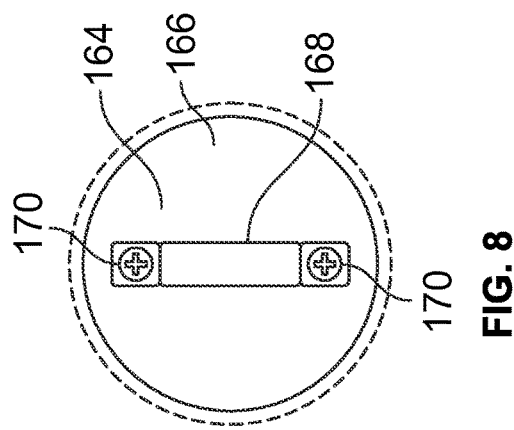
FIG. 8
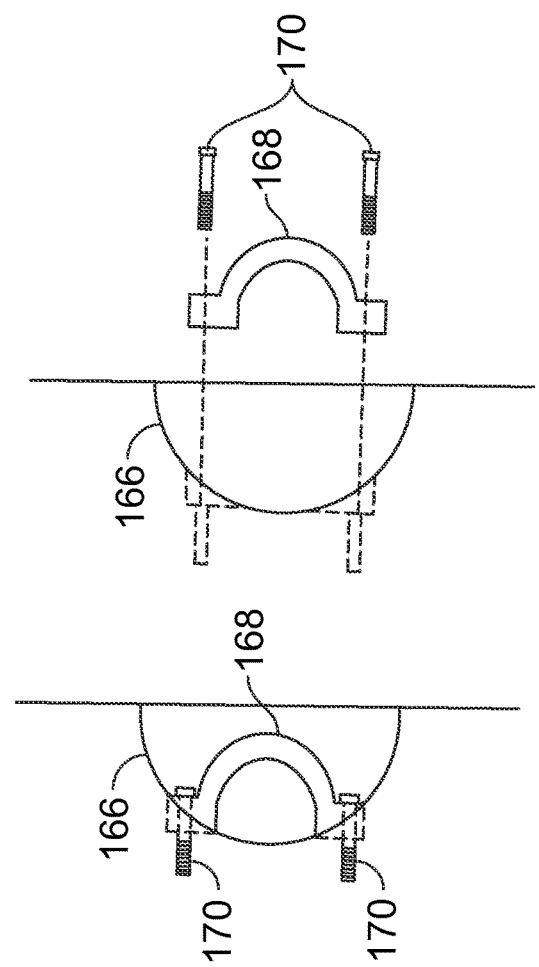
FIG. 10
FIG. 9
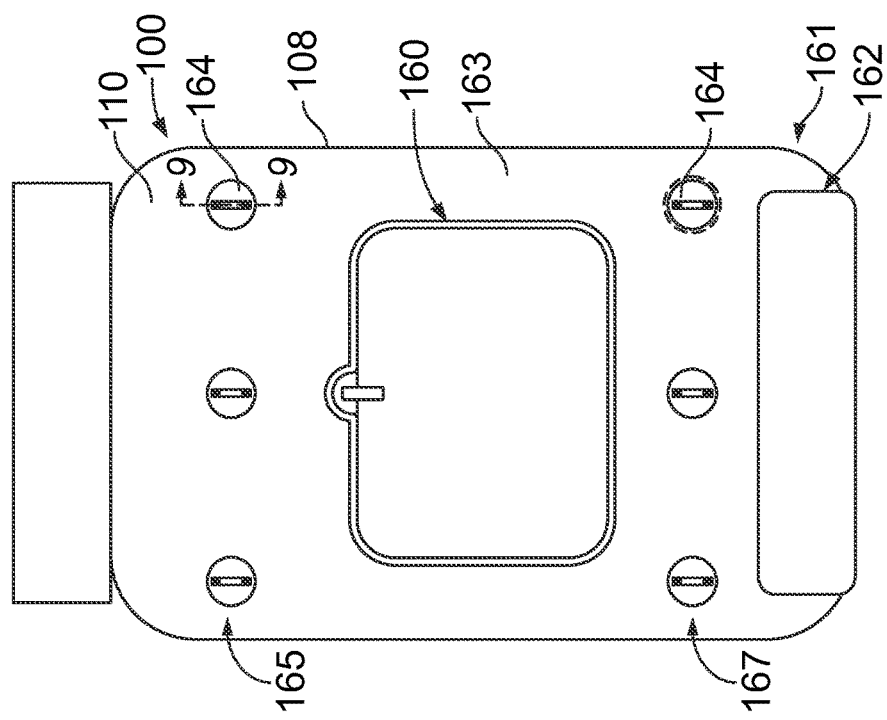
FIG. 7

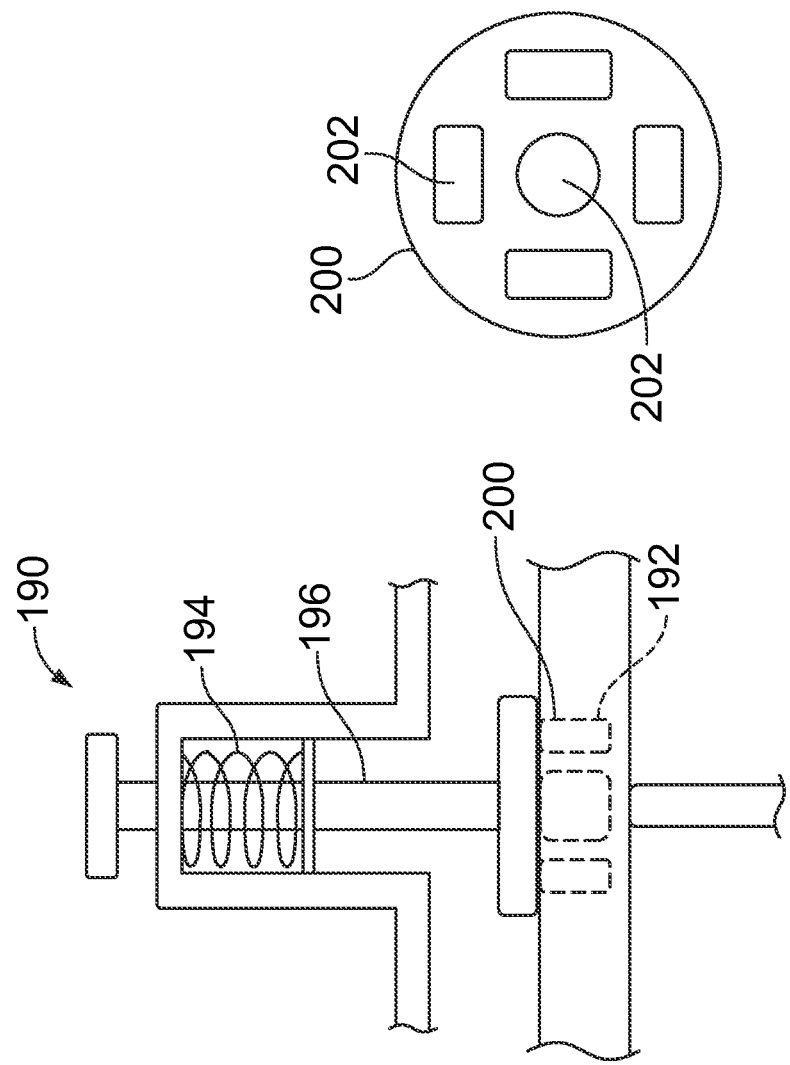
FIG. 19
FIG. 18
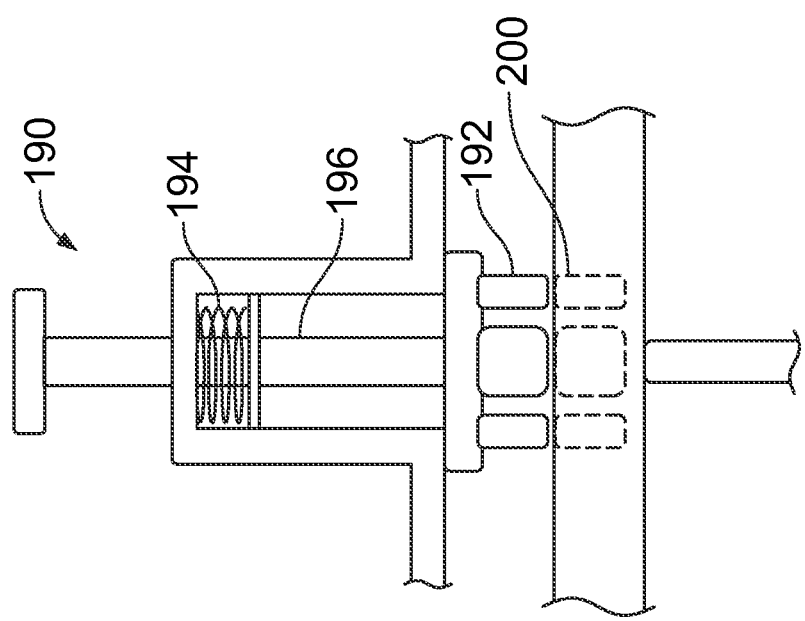
FIG. 17

RECONFIGURABLE SEAT ASSEMBLY

CROSS-REFERENCE TO RELATED APPLICATION

This application claims priority to U.S. patent application Ser. No. 63/289,681, filed Dec. 15, 2021, which is hereby incorporated by reference in its entirety.

FIELD OF THE DISCLOSURE

Examples of the present disclosure generally relate to a reconfigurable seat assembly that is configured to be moved between different positions within an internal cabin of a vehicle, such as a commercial aircraft.

BACKGROUND OF THE DISCLOSURE

Commercial aircraft are used to transport passengers between various locations. An internal cabin of a commercial aircraft typically includes a plurality of seat assemblies that are configured to support passengers seated thereon.

Cargo can be transported within a cargo hold, which is typically below the internal cabin. However, an internal cabin of a commercial aircraft may not always be fully booked with passengers. In certain situations, the internal cabin may be largely devoid of passengers. As such, the commercial aircraft may fly between locations with a substantial portion of the internal cabin generally empty.

SUMMARY OF THE DISCLOSURE

A need exists for a system and a method for utilizing space within an internal cabin that may not be occupied by passengers. Further, a need exists for a seat assembly that can be adapted for different uses.

With those needs in mind, certain examples of the present disclosure provide a seat assembly for an internal cabin of a vehicle. The seat assembly includes a seat cushion, and a backrest pivotally coupled to the seat cushion. The backrest is moveable between a first position and a second position. The first position is configured to allow a passenger to sit on the seat cushion. The second position is configured to allow one or more cargo items to be secured on a rear surface of the backrest.

In at least one example, the backrest is configured to be folded over and onto the seat cushion in the second position.

In at least one example, wherein the rear surface in the second position is flat in relation to a floor of the internal cabin.

The seat assembly can also include one or more armrests pivotally coupled to one or both of the seat cushion or the backrest. The one or more armrests are configured to be pivoted behind the rear surface to provide lateral support for the one or more cargo items when the backrest is in the second position.

The seat assembly can also include one or more securing rails secured to one or more sides of one or both of the seat cushion or the backrest.

In at least one example, the rear surface of the backrest includes a recessed area configured to receive a portion of another seat assembly.

In at least one example, the rear surface of the backrest includes one or more tie down couplers. One or more covers can be configured to removably secure to the one or more tie down couplers.

In at least one example, the backrest includes a headrest that is foldable between an extended position and a retracted position.

In at least one example, the backrest includes a headrest that is configured to telescope between an extended position and a retracted position.

Certain examples of the present disclosure provide a method including moving a backrest of a seat assembly within an internal cabin of a vehicle between a first position and a second position, wherein the backrest is pivotally coupled to a seat cushion; allowing a passenger to sit on the seat cushion when the backrest is in the first position; and allowing one or more cargo items to be secured on a rear surface of the backrest when the backrest is in the second position.

Certain examples of the present disclosure provide an aircraft including an internal cabin, and a seat assembly within the internal cabin, as described herein.

BRIEF DESCRIPTION OF THE DRAWINGS

FIG. 7 illustrates a rear view of a backrest of a seat assembly, according to an example of the present disclosure.

FIG. 8 illustrates a rear view of a tie down coupler, according to an example of the present disclosure.

FIG. 9 illustrates a cross-sectional view of the tie down coupler through line 9-9 of FIG. 7.

FIG. 10 illustrates a cross-sectional exploded view of the tie down coupler of FIG. 9.

FIG. 17 illustrates a lateral view of a locking mechanism being inserted into a receptacle of a seat assembly, according to an example of the present disclosure.

FIG. 18 illustrates a lateral view of the locking mechanism inserted into the receptacle of the seat assembly.

FIG. 19 illustrates a front view of the receptacle of the seat assembly, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide a seat assembly for an internal cabin of a vehicle, such as a commercial aircraft. The seat assembly is adjustable between a first position and a second position that differs from the first position. In at least one example, the first position is a passenger seating position in which the seat assembly is configured to support a passenger in a seated orientation. The second position is a cargo supporting position in which the seat assembly securely supports cargo. As such, the seat assembly can be moved between the different positions without the need for reconfiguring the aircraft itself. Examples of the present disclosure provide a seat assembly that allows for transport of cargo items that would otherwise be too large to fit on a seat cushion of a typical seat assembly.

Certain examples of the present disclosure provide a foldable seat assembly for supporting cargo on a backside of the seat and along rows of seats. The seat assembly can be moved from a deployed/seated position to a stowed/cargo position, and the armrest(s) pivot upwardly, when in the stowed position, to provide lateral support for the cargo on the back of the seat. The backs of each seat assembly can include hook/strap features. In at least one example, the seat assembly includes a lower seat plate recession to receive/support an extended headrest plate of the adjacent/aft seat when folded down. A longitudinal row of seats, when all stowed, can provide a continuous upper support surface for cargo because of the manner in which the seats interface with each other when folded down. To address potential seat pitch issues, the headrest can be hinged so that it collapses in on itself, or the headrest could be telescopic.

The reconfigurable seat assembly allows for revenue generation, such as by hauling increased amounts of cargo, when passenger flights are not full. Further, the seat assembly prevents damage to seat interiors when transporting cargo in the interior cabin.

Figure 1:
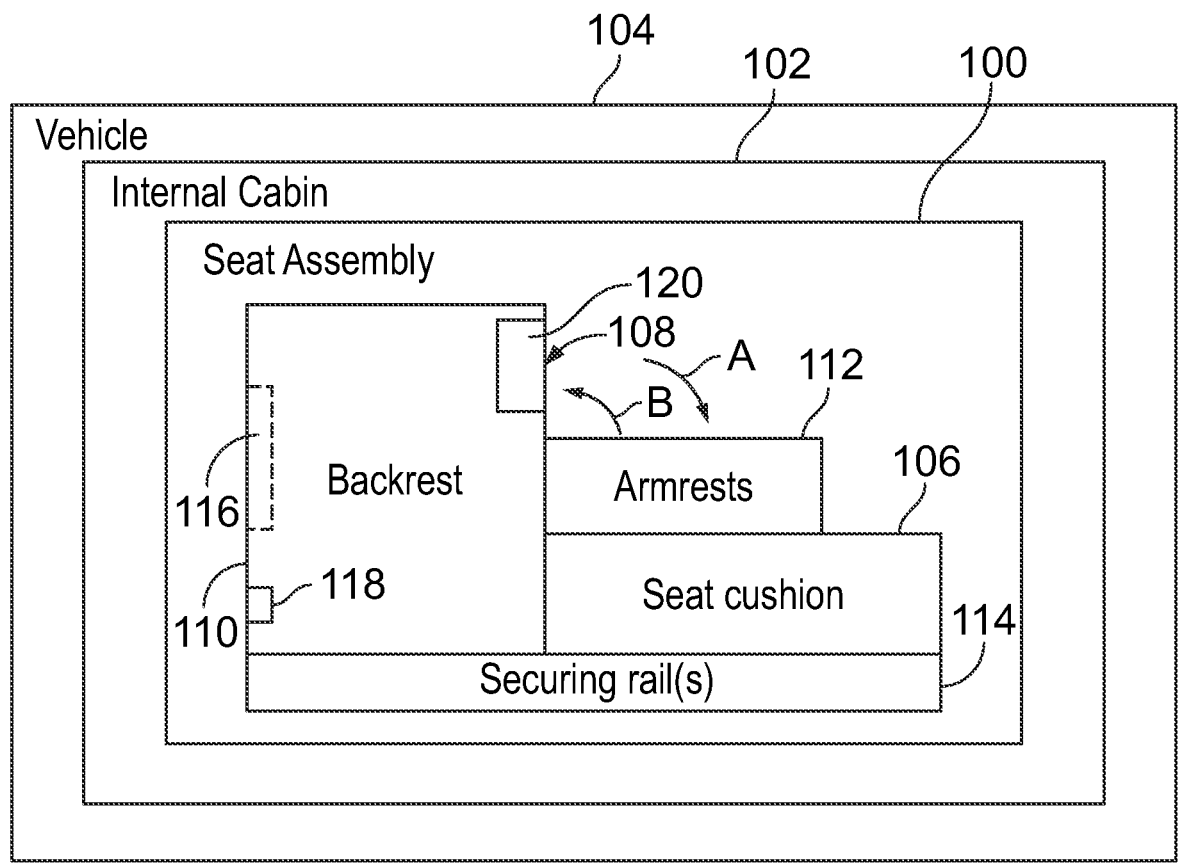
FIG. 1 illustrate a block diagram of a seat assembly for an internal cabin of a vehicle, according to an example of the present disclosure.

FIG. 1 illustrate a block diagram of a seat assembly 100 for an internal cabin 102 of a vehicle 104, according to an example of the present disclosure. The seat assembly 100 includes a seat cushion 106, and a backrest 108 pivotally coupled to the seat cushion 106. The backrest 108 is moveable between a first position and a second position. The first position is configured to allow a passenger to sit on the seat cushion 106. The second position is configured to allow one or more cargo items to be secured on a rear surface 110 of the backrest 108. In at least one example, the backrest 108 is configured to be folded over in the direction of arc A, and onto the seat cushion 106 in the second position.

The seat assembly 100 can also include one or more armrests 112 pivotally coupled to one or both of the seat cushion 106 and/or the backrest 108. The one or more armrests 112 are configured to be pivoted in the direction of arc B behind the rear surface 110 to provide lateral support for the one or more cargo items when the seat assembly 100 is in the second position. One or more securing rails 114 can be secured to sides of one or both of the seat cushion 106 and/or the backrest 108.

The rear surface 110 of the backrest 108 can include a recessed area 116 configured to receive a portion of another seat assembly. The rear surface of the backrest can include one or more tie down couplers 118. One or more covers can be configured to removably secure to the one or more tie down couplers 118. In at least one example, the backrest 108 includes a headrest 120 that is configured to fold downwardly or telescope.

Figure 2:
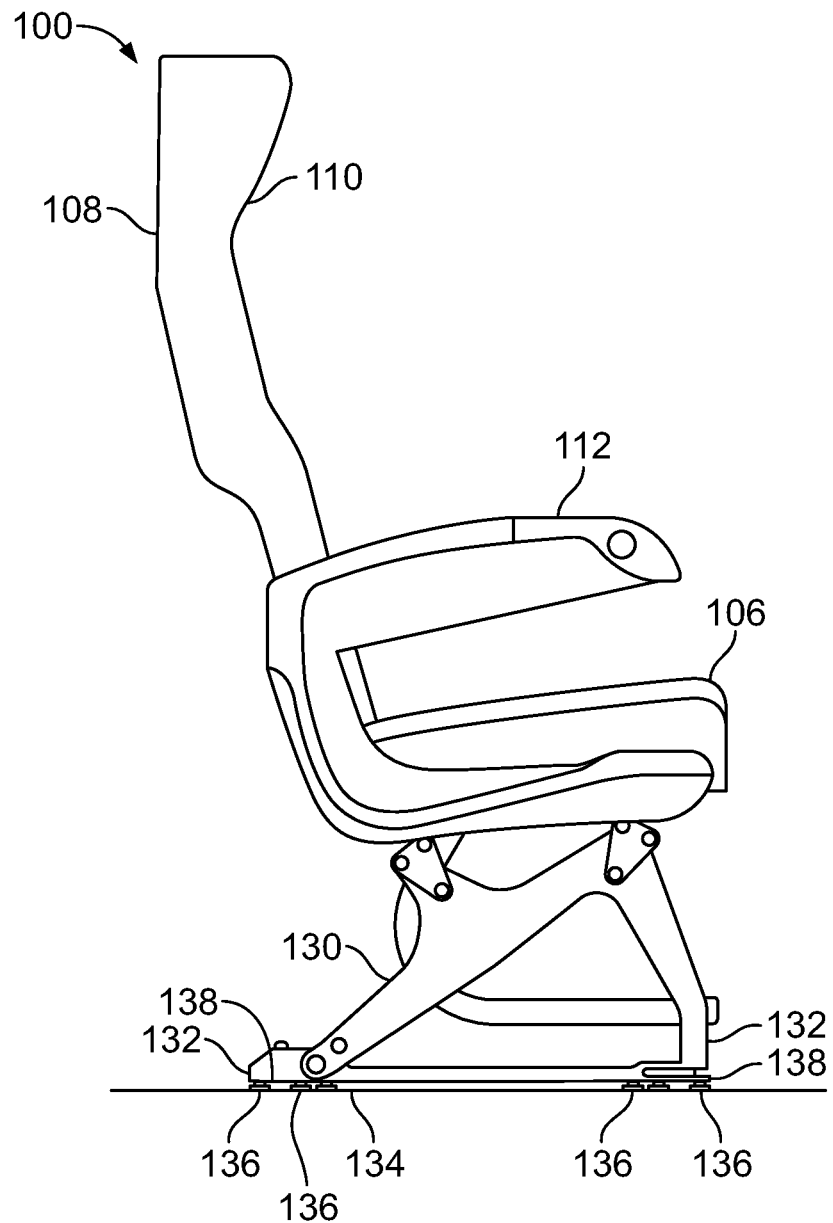
FIG. 2 illustrates a side view of a seat assembly, according to an example of the present disclosure.

FIG. 2 illustrates a side view of a seat assembly 100, according to an example of the present disclosure. The seat assembly 100 is configured to be secured within an internal cabin of a vehicle, such as a commercial aircraft. In at least one example, the seat assembly 100 includes a base 130, which may include legs 132 that may be secured to seat tracks 134 within the internal cabin of the vehicle. Securing studs 136 (such as shear studs) may downwardly extend from lower surfaces 138 of the legs 132. The securing studs 136 are securely retained within the seat tracks 134. The seat tracks 134 are configured to securely couple to the securing studs 136 to secure the seat assembly 100 in place. In at least one example, the base 130 supports the seat cushion 106 and the backrest 108, which includes the headrest 120. Armrests 112 may be pivotally secured to the backrest 108. Optionally, the armrests 112 may be pivotally secured to the seat cushion 106. Optionally, the armrests 112 may be pivotally secured to the backrest 108 and the seat cushion, such as at a union or coupling therebetween.

The seat assembly 100 may be sized and shaped differently than shown in FIG. 2. The seat assembly 100 may include more or less components than shown in FIG. 2. It is to be understood that the seat assembly 100 shown in FIG. 2 is merely one example of a seat assembly that may be disposed within an internal cabin of a vehicle.

Figure 3:
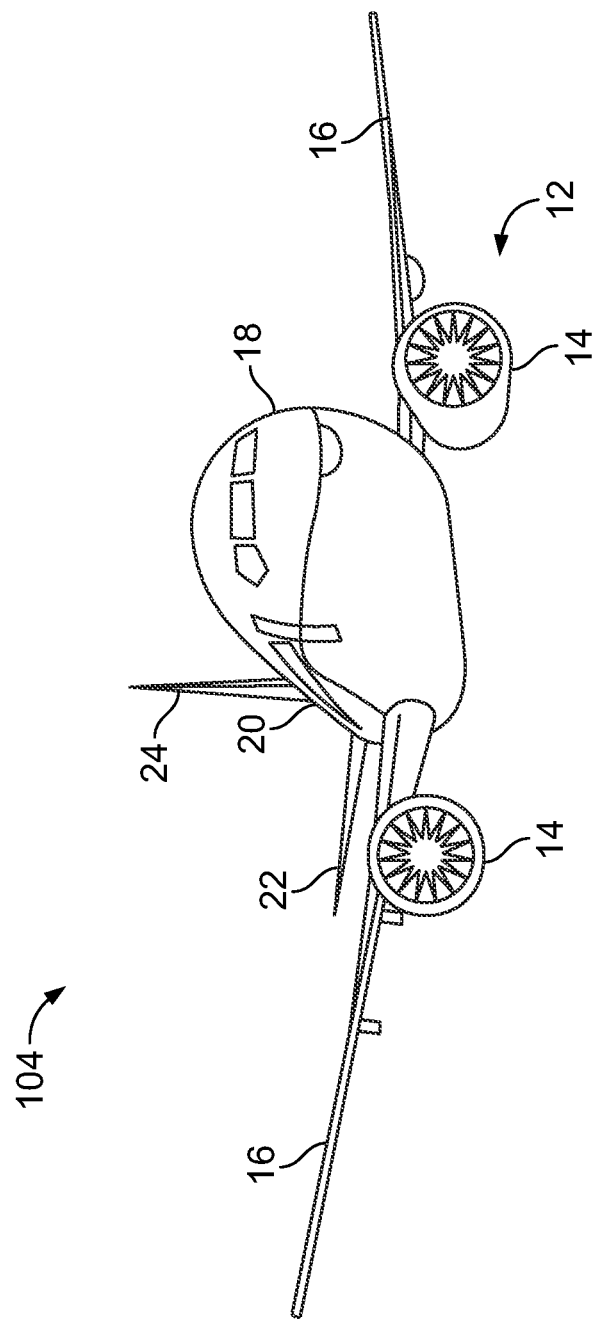
FIG. 3 illustrates a perspective front view of an aircraft, according to an example of the present disclosure.

FIG. 3 illustrates a perspective front view of an aircraft 104, according to an example of the present disclosure. The aircraft 104 is an example of the vehicle 104 shown and described with respect to FIG. 1. The aircraft 104 includes a propulsion system 12 that includes engines 14, for example. Optionally, the propulsion system 12 may include more engines 14 than shown. The engines 14 are carried by wings 16 of the aircraft 104. In other examples, the engines 14 may be carried by a fuselage 18 and/or an empennage 20.

The empennage 20 may also support horizontal stabilizers 22 and a vertical stabilizer 24.

The fuselage 18 of the aircraft 104 defines an internal cabin, which may be defined by interior sidewall panels that connect to a ceiling and a floor. The internal cabin may include a cockpit or flight deck, one or more work sections (for example, galleys, personnel carry-on baggage areas, and the like), one or more passenger sections (for example, first class, business class, and economy sections), and the like.

Alternatively, instead of an aircraft, examples of the present disclosure may be used with various other vehicles, such as automobiles, buses, locomotives and train cars, seacraft, spacecraft, and the like.

Figure 4:
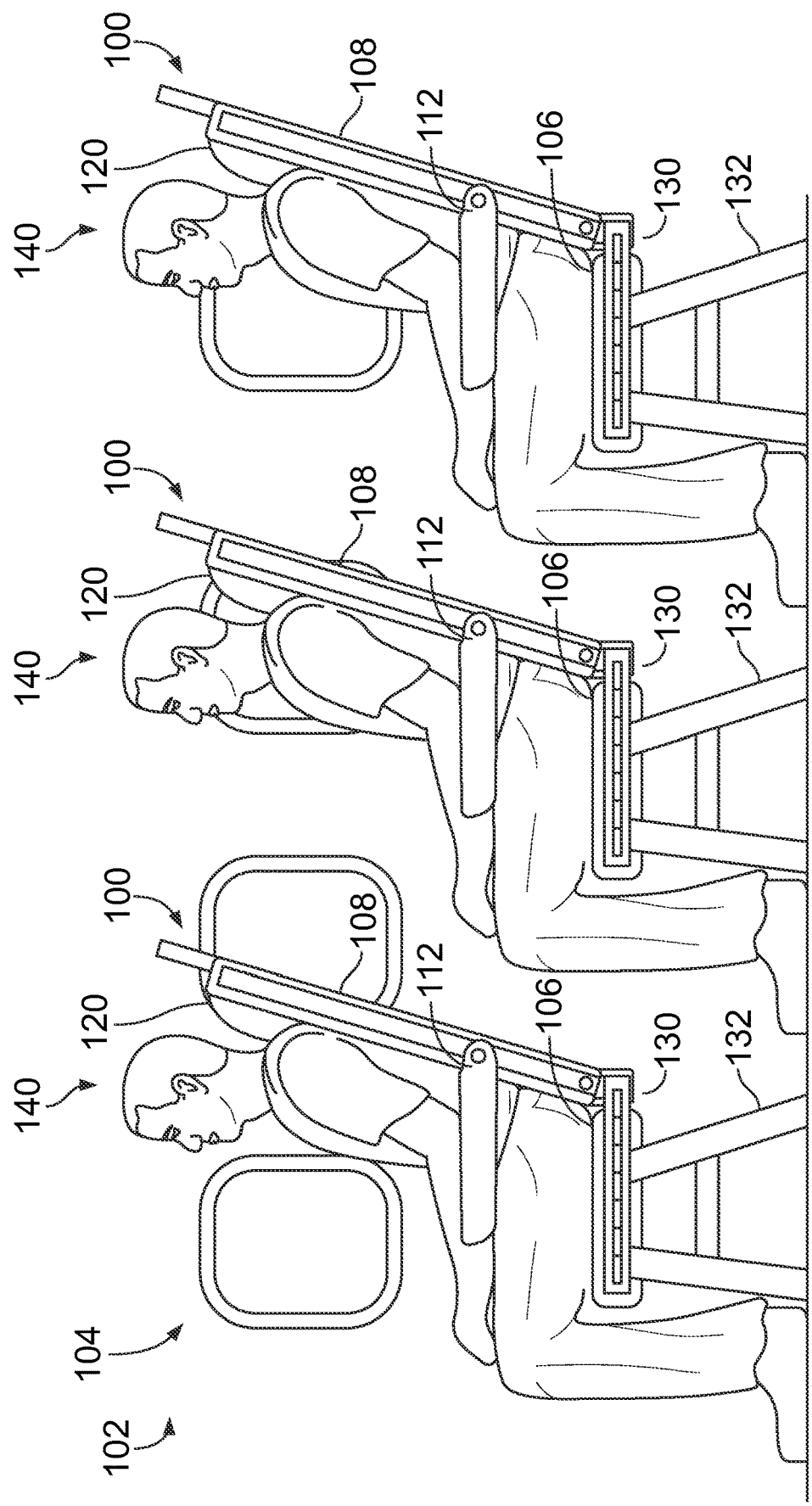
FIG. 4 illustrates a lateral view of seat assemblies in first positions within an internal cabin of a vehicle, according to an example of the present disclosure.

FIG. 4 illustrates a lateral view of seat assemblies 100 within an internal cabin 102 of a vehicle 104, according to an example of the present disclosure. In at least one example, the vehicle 104 is a commercial aircraft. Each seat assembly 100 includes a seat cushion 106, which may include legs 132 that may be secured to seat tracks within the internal cabin 102.

The seat assembly 100 may be sized and shaped differently than shown in FIG. 4. The seat assembly 100 may include more or less components than shown in FIG. 4. It is to be understood that the seat assembly 100 shown in FIG. 4 is merely one example of a seat assembly that may be disposed within the internal cabin 102.

As shown in FIG. 4, the seat assembly 100 is in a first position, such as a passenger seating position, in which the seat assembly 100 is configured to support a passenger 140 on the seat cushion 106 in a seated orientation. In the first position, the backrest 108 is extended upwardly and rearwardly to allow the passenger to sit on the seat cushion 106.

Figure 5:
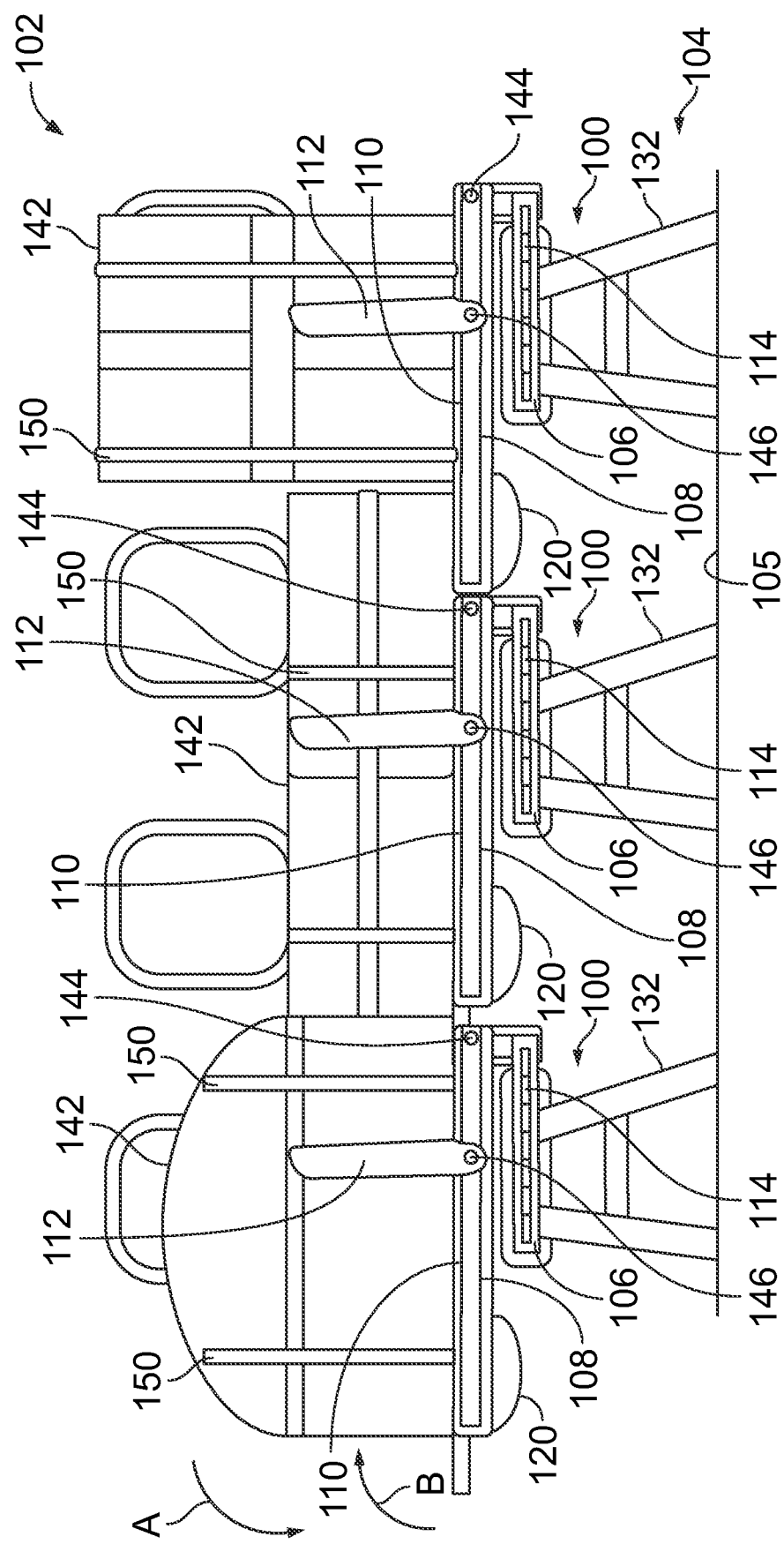
FIG. 5 illustrates a lateral view of the seat assemblies in second positions within the internal cabin of the vehicle.

FIG. 5 illustrates a lateral view of the seat assemblies 100 in second positions within the internal cabin 102 of the vehicle 104. The second position is a cargo support position, in which cargo items 142 are supported on rear surfaces 110 of the backrests 108.

In order to move the seat assemblies 100 between the first position and the second position, the backrests 108 are pivoted about pivot axes 144. For example, the pivot axes 144 are pivotal couplings between the backrests 108 and the seat cushions 106. To move a seat assembly 100 from the first position to the second position, the backrest 108 is folded downwardly in the direction of arc A over the seat cushion 106 about the pivot axis 144. In at least one example, the backrest 108 is folded down so that the rear surface 110 is flat (or substantially flat) in relation to a floor 105 of the internal cabin 102. The floor 105 supports the seat assemblies 100, such as when the legs 132 are secured to seat tracks on and/or within the floor 105 (as described with respect to FIG. 2). For example, in the second position, the rear surface 110 is parallel (or substantially parallel, such as within +/−5 degrees) with the floor 105 that supports the seat assembly 100.

Portions of a backrest 108, such as headrests 120, can couple with reciprocal portions of a forward seat assembly (such as recessed area 116, shown in FIG. 1, within a backrest 108 of a forward seat assembly) to provide a contiguous, flat surface between multiple seat assemblies 100. In this manner, the seat assemblies 100 can be linked together to provide a longer cargo supporting surface.

In the second position, the armrests 112 can be pivoted in the direction of arc B rearwardly (and/or upwardly) behind the rear surfaces 110 about pivot axes 146. In this manner, the armrests 112 can be vertically oriented on sides of the cargo items 142, and provide lateral barriers to assist in securing the cargo items 142.

The rear surfaces 110 of the backrests 108 can include couplings that are configured to securely engage portions of cargo straps 150. The cargo straps 150 are used to secure the cargo items 142 on the backrests 108.

In at least one example, a securing rail 114 extends along sides of the seat cushions 106 (and/or the backrest 108). The securing rail 114 can include a plurality of protuberances on which portions of cargo nets can be positioned.

In at least one example, when the backrest 108 is in the second position such that it is folded over and onto the seat cushion 106, an individual (such as a passenger) is unable to sit on the seat cushion 106. Because the seat cushion 106 is covered by the folded over backrest 108, the seat cushion 106 is not exposed and able to accommodate an individual sitting on the seat cushion 106. As such, when the backrest 108 is in the second position, the seat cushion 106 may be incapable of allowing an individual to sit thereon. Alternatively, a portion of the seat cushion 106 can be exposed when the backrest 108 is in the second position.

Figure 6:
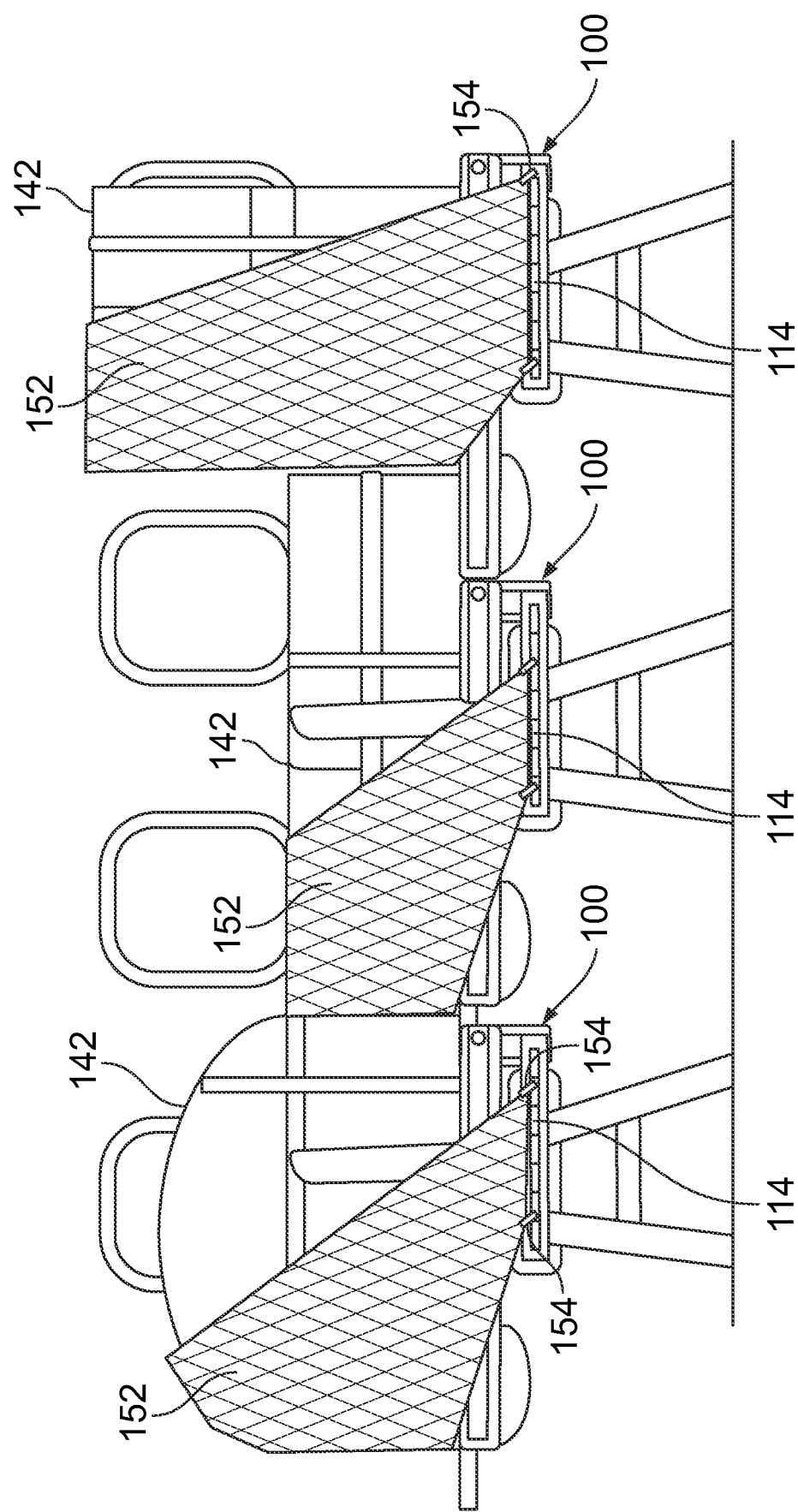
FIG. 6 illustrates a lateral view of the seat assemblies in second positions having cargo nets secured to securing rails.

FIG. 6 illustrates a lateral view of the seat assemblies 100 in second positions having cargo nets 152 secured to the securing rails 114. Each side of a seat assembly 100 can include a securing rail 114. Thus, a cargo net 152 can couple to both securing rails 114 of the seat assembly 100. The cargo nets 152 include couplers 154, such as clips, that removably secure to the protuberances (such as studs, barbs, posts, hooks, loops, and/or the like) of the securing rail 114.

FIG. 7 illustrates a rear view of the backrest 108 of the seat assembly 100, according to an example of the present disclosure. The rear surface 110 of the backrest 108 can include a deployable tray table 160, which can be below the headrest. A lower portion 161 (below the tray table 160, and which is at or proximate to (such as within six inches or less) the bottom end of the rear of the rear surface 110) of the backrest 108 includes a recessed area 162 (an example of the recessed area 116 shown in FIG. 1) that is configured to receive a portion of a headrest of another seat assembly, so that the backrest of the other seat assembly remains flush in the folded, second position. The recessed area 162 is inwardly set in relation to an outermost plane 163 of the rear surface 110 of the backrest 108. The recessed area 162 extends inwardly toward the front of the backrest 108.

A plurality of tie down couplers 164 are disposed on and/or within the rear surface 110 of the backrest 108. As shown, the backrest 108 may include three upper tie down couplers 164 disposed above the tray table 160, and three lower tie down couplers 164 disposed below the tray table 160 (and above the recessed area 162). The upper tie down couplers 164 are arranged in a first linear row 165, and are regularly spaced along a width of the backrest 108. Similarly, the lower tie down couplers 164 are arranged in a second linear row 167, and are regularly spaced along a width of the backrest 108. Optionally, the backrest 108 may include more or less tie down couplers 164 than shown. For example, the backrest 108 can include a single row (or three or more rows) of tie down couplers 164. Further, each row can include more or less tie down couplers 164 than shown. For example, a row can include two, or four or more tie down couplers 164. As another example, tie down couplers 164 may not be arranged in rows. For example, the backrest 108 may include one tie down coupler 164 above the tray table 160 and/or one tie down coupler 164 below the tray table 160.

FIG. 8 illustrates a rear view of a tie down coupler 164, according to an example of the present disclosure. FIGS. 9 and 10 illustrate cross-sectional views of the tie down coupler 164 through line 9-9 of FIG. 7. In at least one example, the tie down coupler 164 includes a recessed base 166, such as a hemispherical cutout formed into the rear surface 110 of the backrest 108, and a tie down ring 168, which can be removably secured within the recessed base 166, such as by fasteners 170. The recessed base 166 ensures that the tie down rings 168 do not protrude outwardly past the rear surface 110 of the backrest 108.

Figure 11:
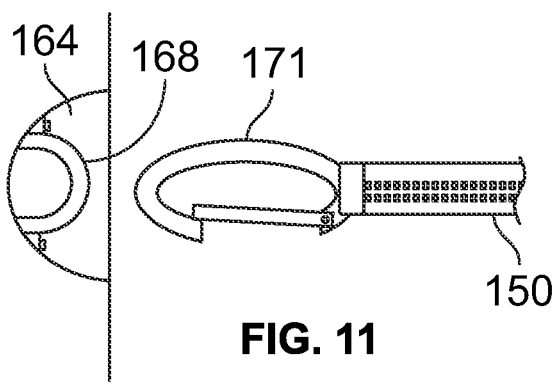
FIG. 11 illustrates a clip of a cargo strap that is configured to removably secured to a tie down coupler, according to an example of the present disclosure.
Figure 12:
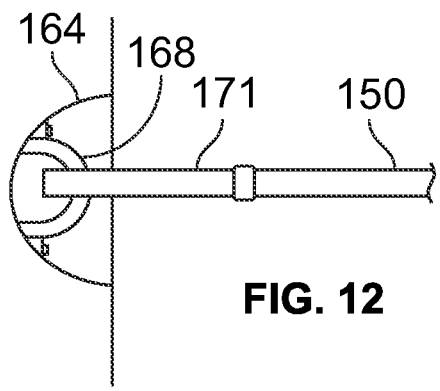
FIG. 12 illustrates a clip of a cargo strap that is configured to removably secured to a tie down coupler, according to an example of the present disclosure.

FIG. 11 illustrates a clip 171 of a cargo strap 150 that is configured to removably secured to a tie down coupler 164, according to an example of the present disclosure. FIG. 12 illustrates a clip 171 of a cargo strap 150 that is configured to removably secured to a tie down coupler 164, according to an example of the present disclosure. Referring to FIGS. 11 and 12, the cargo strap 150 can be equipped with a carabiner connecting to the tie down ring. There are a multitude of different cargo strap ends that can connect to a ring end. FIGS. 11 and 12 merely show an example of a clip 171 that can be used to connect to the ring end.

Figure 13:
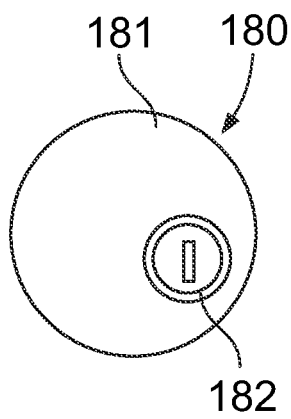
FIG. 13 illustrates a front view of a cover for a tie down coupler, according to an example of the present disclosure.
Figure 14:
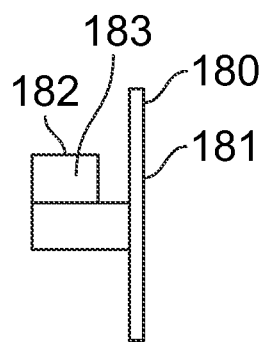
FIG. 14 illustrates a lateral view of the cover of FIG. 13.
Figure 15:
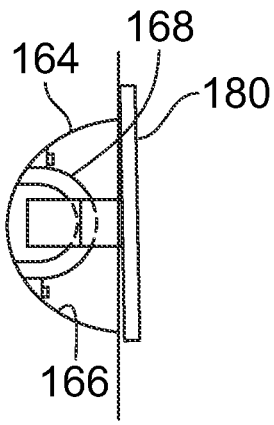
FIG. 15 illustrates a lateral view of the cover of FIGS. 13 and 14 secured to a tie down coupler, according to an example of the present disclosure.

FIG. 13 illustrates a front view of a cover 180 for a tie down coupler 164, according to an example of the present disclosure. FIG. 14 illustrates a lateral view of the cover 180 of FIG. 13. FIG. 15 illustrates a lateral view of the cover 180 of FIGS. 13 and 14 secured to the tie down coupler 164, according to an example of the present disclosure. Referring to FIGS. 13-15, in at least one example, the cover 180 includes a face plate 181 that is configured to fit over recessed base 166. For example, the diameter of the face plate 181 is greater than a diameter of the recessed base 166. A lock 182 is secured to the face plate 181, and is configured to be moved to a locking position in relation to the tie down ring 168. Lockable injection molded plastic or thick rubber pads can be used to cover the hemispherical cutout and tie down ring when not in use. In at least one example, the lock 182 can include a hook 183 that is configured to latch behind the tie down ring 168 in a locked position. Optionally, the seat assembly 100 may not include the cover.

Figure 16:
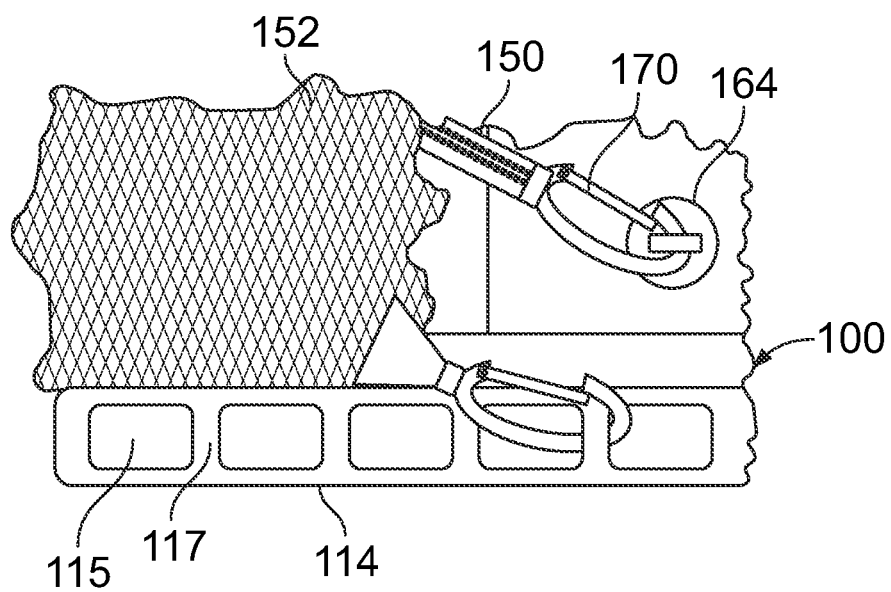
FIG. 16 illustrates a lateral view of a cargo net secured to a securing rail and a cargo strap secured to a tie down coupler, according to example of the present disclosure.

FIG. 16 illustrates a lateral view of a cargo net 152 secured to the securing rail 114 and the cargo strap 150 secured to the tie down coupler 164, according to example of the present disclosure. The securing rail 114 can include one or more channels 115 and beams 117, which can extend over the channel(s). The clips 170 can secure onto the beams 117. The securing rail 114 provides connection points (such as the beams 117) to affix a cargo net to the seat assembly 100. A hook that attaches the cargo net 152 to the securing rail 114 can be similar to those of the cargo straps 150 shown in FIGS. 11 and 12. The cargo net 152 provides additional forward load support for the cargo items.

FIG. 17 illustrates a lateral view of a locking mechanism 190 being inserted into a receptacle 200 of a seat assembly, according to an example of the present disclosure. FIG. 18 illustrates a lateral view of the locking mechanism 190 inserted into the receptacle 200 of the seat assembly. FIG. 19 illustrates a front view of the receptacle 200 of the seat assembly, according to an example of the present disclosure. Referring to FIGS. 17-19, the receptacle 200 can include a plurality of openings 202 that corresponding to insertion keys 192 of the locking mechanism 190. The receptacle 200 can be on and/or proximate to (such as within six inches or less) of a pivot axis of the backrest 108, for example. The locking mechanism 190 can be used to lock the backrest and/or the armrests in position. In at least one example, the locking mechanism 190 includes a spring 194 coupled to a plunger 196. In this manner, the locking mechanism 190 can be a spring-biased lock that is configured to lock the armrests and/or the backrest at desired positions in relation to the respective pivot axes. The locking mechanism 190 shown in FIGS. 17 and 18 is merely exemplary. Various other types of lock mechanism can be used.

Figure 20:
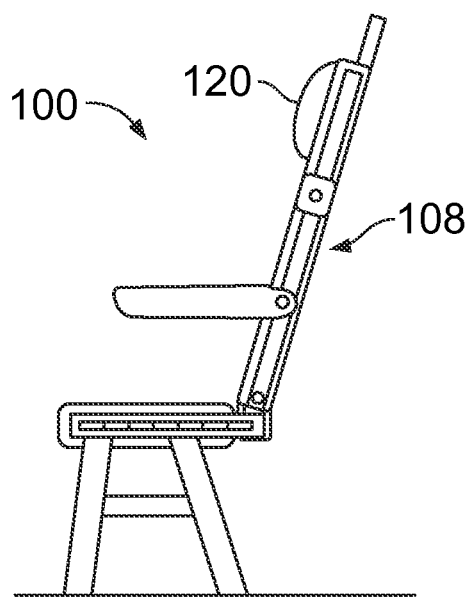
FIG. 20 illustrates a lateral view of a seat assembly in a first position, according to an example of the present disclosure.
Figure 21:
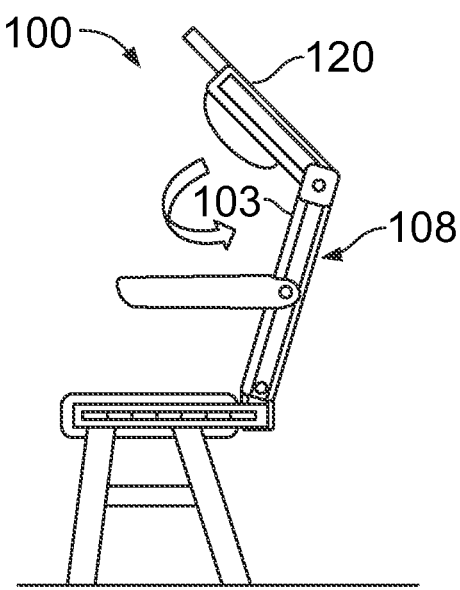
FIG. 21 illustrates a lateral view of the seat assembly of FIG. 20 having a headrest being initially folded.
Figure 22:
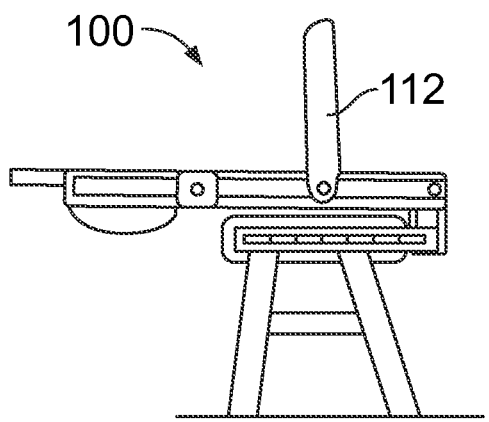
FIG. 22 illustrates a lateral view of the seat assembly of FIG. 20 in a second position.
Figure 23:
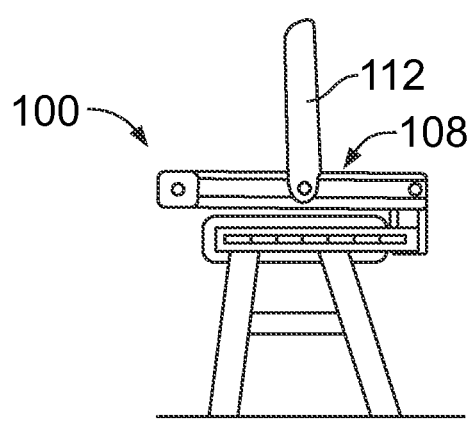
FIG. 23 illustrates a lateral view of the seat assembly of FIG. 20 in the second position having the headrest fully inwardly folded.

FIG. 20 illustrates a lateral view of a seat assembly 100 in a first position, according to an example of the present disclosure. FIG. 21 illustrates a lateral view of the seat assembly 100 of FIG. 20 having a headrest 120 being initially inwardly folded toward a front support surface 109 of the backrest 108. FIG. 22 illustrates a lateral view of the seat assembly 100 of FIG. 20 in a second position with the headrest 120 fully extended. FIG. 23 illustrates a lateral view of the seat assembly 100 of FIG. 20 in the second position having the headrest 120 fully inwardly folded. Referring to FIGS. 20-23, the seat assembly 100 is moveable between the different positions, as described herein. In at least one example, the headrest 120 is foldable between an extended position (shown in FIGS. 20 and 22) and a retracted position (shown in FIG. 23). For example, the headrest 120 can be folded downwardly and inwardly toward and into the front support surface 109 of the backrest 108 to decrease a length of the backrest 108 in the second position. The foldable headrest 120 can be used with any of the examples described herein. Optionally, the headrest 120 may not be foldable.

Figure 24:
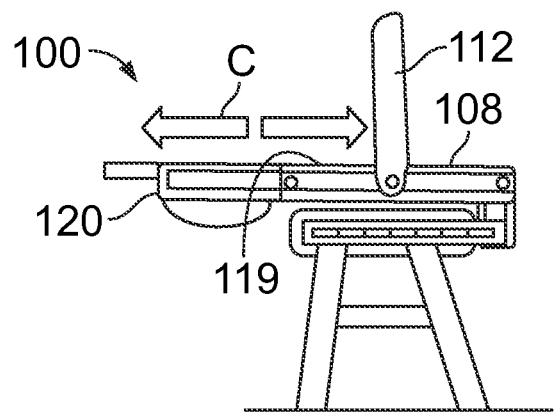
FIG. 24 illustrates a lateral view of a seat assembly in a second position, according to an example of the present disclosure.

FIG. 24 illustrates a lateral view of a seat assembly 100 in a second position, according to an example of the present disclosure. The headrest 120 can be configured to telescope or otherwise slide between an extended position and a retracted position. As shown, the headrest 120 can telescope inwardly and outwardly in the direction of arrows C to selectively decrease and increase a length of the backrest 108 in the second position (and optionally in the first position). For example, the headrest 120 can include one or more tracks that cooperate with reciprocal tracks, rails, and/or the like on and/or within a main body 119 of the backrest 108. The tracks allow the headrest 120 to recess into and extend from the main body 119. The headrest 120 and the main body 119 allow for telescoping motion through rollers, rails, tracks, and/or the like. The telescoping headrest 120 can be used with any of the examples described herein. Optionally, the headrest 120 may not be configured to telescope or otherwise recede into and extend from the main body 119.

Figure 25:
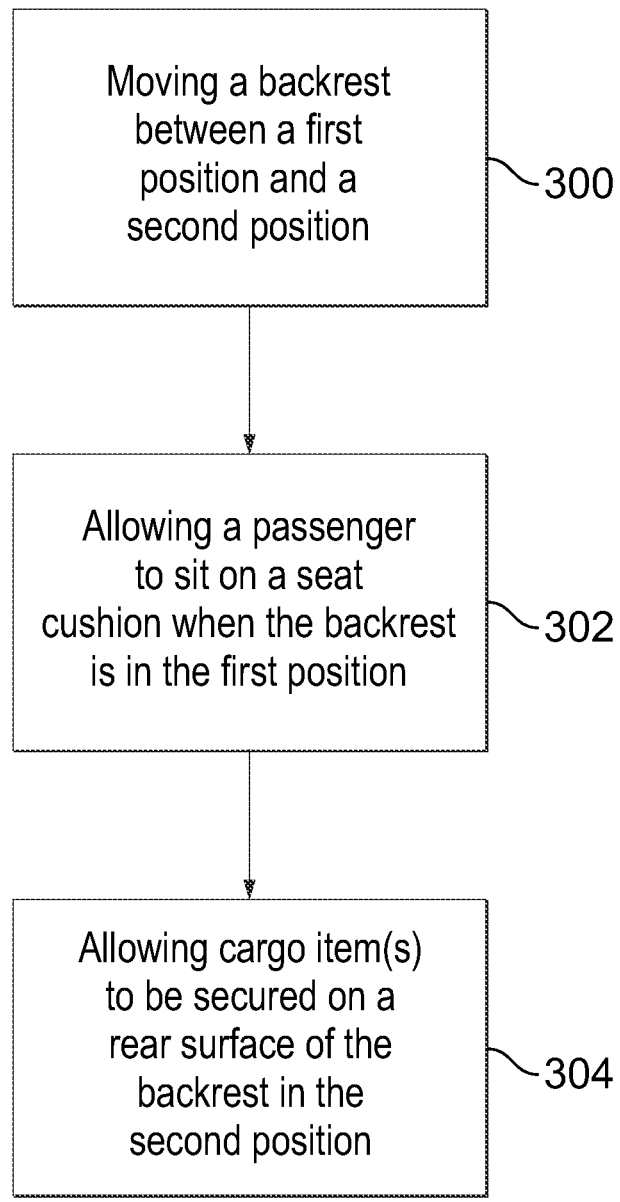
FIG. 25 illustrates a flow chart of a method, according to an example of the present disclosure.

FIG. 25 illustrates a flow chart of a method, according to an example of the present disclosure. Referring to FIGS. 1 and 25, the method includes moving, at 300, the backrest 108 of the seat assembly 100 within the internal cabin 102 of the vehicle 104 between a first position and a second position. The backrest 108 is pivotally coupled to the seat cushion 106. The method also includes allowing, at 302, a passenger to sit on the seat cushion 106 when the backrest 108 is in the first position, and allowing, at 304, one or more cargo items to be secured on the rear surface 110 of the backrest 108 when the backrest 108 is in the second position. In at least one example, the moving 300 includes folding the backrest 108 over and onto the seat cushion 106 in the second position. In at least one example, the method also includes pivoting one or more armrests 112 behind the rear surface 110 to provide lateral support for the one or more cargo items when the backrest 108 is in the second position. In at least one example, the method also includes securing a cargo net to one or more securing rails 114 secured to one or more sides of one or both of the seat cushion 106 or the backrest 108. The method can also include receiving a portion of another seat assembly within a recessed area 116 of the rear surface 110 of the backrest 108 when the backrest 108 is in the second position. The method may also include securing one or more straps to one or more tie down couplers on or within the rear surface 110 of the backrest 108. The method may also include removably securing one or more covers to the one or more tie down couplers. The method may also include moving the headrest 120 of the backrest 108 between an extended position and a retracted position.

Further, the disclosure comprises examples according to the following clauses:

Clause 1. A seat assembly for an internal cabin of a vehicle, the seat assembly comprising:
a seat cushion; and
a backrest pivotally coupled to the seat cushion, the backrest moveable between a first position and a second position, wherein the first position is configured to allow a passenger to sit on the seat cushion, and wherein the second position is configured to allow one or more cargo items to be secured on a rear surface of the backrest.

Clause 2. The seat assembly of Clause 1, wherein the backrest is configured to be folded over and onto the seat cushion in the second position.

Clause 3. The seat assembly of Clauses 1 or 2, wherein the rear surface in the second position is flat in relation to a floor of the internal cabin.

Clause 4. The seat assembly of any of Clauses 1-3, further comprising one or more armrests pivotally coupled to one or both of the seat cushion or the backrest, wherein the one or more armrests are configured to be pivoted behind the rear surface to provide lateral support for the one or more cargo items when the backrest is in the second position.

Clause 5. The seat assembly of any of Clauses 1-4, further comprising one or more securing rails secured to one or more sides of one or both of the seat cushion or the backrest.

Clause 6. The seat assembly of any of Clauses 1-5, wherein the rear surface of the backrest comprises a recessed area configured to receive a portion of another seat assembly.

Clause 7. The seat assembly of any of Clauses 1-6, wherein the rear surface of the backrest comprises one or more tie down couplers.

Clause 8. The seat assembly of Clause 7, further comprising one or more covers that are configured to removably secure to the one or more tie down couplers.

Clause 9. The seat assembly of any of Clauses 1-8, wherein the backrest comprises a headrest that is foldable between an extended position and a retracted position.

Clause 10. The seat assembly of any of Clauses 1-9, wherein the backrest comprises a headrest that is configured to telescope between an extended position and a retracted position.

Clause 11. A method comprising:
moving a backrest of a seat assembly within an internal cabin of a vehicle between a first position and a second position, wherein the backrest is pivotally coupled to a seat cushion;
allowing a passenger to sit on the seat cushion when the backrest is in the first position; and
allowing one or more cargo items to be secured on a rear surface of the backrest when the backrest is in the second position.

Clause 12. The method of Clause 11, wherein said moving comprises folding the backrest over and onto the seat cushion in the second position.

Clause 13. The method of Clauses 11 or 12, wherein the rear surface in the second position is flat in relation to a floor of the internal cabin.

Clause 14. The method of any of Clauses 11-13, further comprising pivoting one or more armrests behind the rear surface to provide lateral support for the one or more cargo items when the backrest is in the second position.

Clause 15. The method of any of Clauses 11-14, further comprising securing a cargo net to one or more securing rails secured to one or more sides of one or both of the seat cushion or the backrest.

Clause 16. The method of any of Clauses 11-15, further comprising receiving a portion of another seat assembly within a recessed area of the rear surface of the backrest when the backrest is in the second position.

Clause 17. The method of any of Clauses 11-16, further comprising securing one or more straps to one or more tie down couplers on or within the rear surface of the backrest.

Clause 18. The method of Clause 17, further comprising removably securing one or more covers to the one or more tie down couplers.

Clause 19. The method of any of Clauses 11-18, further comprising moving a headrest of the backrest between an extended position and a retracted position.

Clause 20. An aircraft comprising:
an internal cabin; and
a seat assembly within the internal cabin, the seat assembly comprising:
a seat cushion;
a backrest pivotally coupled to the seat cushion, the backrest moveable between a first position and a second position, wherein the first position is configured to allow a passenger to sit on the seat cushion, wherein the second position is configured to allow one or more cargo items to be secured on a rear surface of the backrest, wherein the backrest is configured to be folded over and onto the seat cushion in the second position, wherein the rear surface of the backrest comprises a recessed area configured to receive a portion of another seat assembly, and wherein the rear surface of the backrest comprises one or more tie down couplers;
one or more securing rails secured to one or more sides of one or both of the seat cushion or the backrest; and
one or more armrests pivotally coupled to one or both of the seat cushion or the backrest, wherein the one or more armrests are configured to be pivoted behind the rear surface to provide lateral support for the one or more cargo items when the backrest is in the second position.

As described herein, examples of the present disclosure provide systems and methods for utilizing space within an internal cabin that may not be occupied by passengers. Further, examples of the present disclosure provide a seat assembly that can be adapted for different uses.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
an internal cabin; and
a seat assembly within the internal cabin, the seat assembly comprising:
a seat cushion;
a backrest pivotally coupled to the seat cushion, the backrest moveable between a first position and a second position, wherein the first position is configured to allow a passenger to sit on the seat cushion, wherein the second position is configured to allow one or more cargo items to be secured on a rear surface of the backrest, wherein the backrest is configured to be folded over and onto the seat cushion in the second position, wherein the rear surface of the backrest comprises a recessed area configured to receive a portion of another seat assembly, and wherein the rear surface of the backrest comprises one or more tie down couplers;
one or more securing rails secured to one or more sides of one or both of the seat cushion or the backrest; and
one or more armrests pivotally coupled to one or both of the seat cushion or the backrest, wherein the one or more armrests are configured to be pivoted behind the rear surface to provide lateral support for the one or more cargo items when the backrest is in the second position.

2. The aircraft of claim 1, wherein the seat assembly further comprises one or more covers that are configured to removably secure to the one or more tie down couplers.

3. The aircraft of claim 1, wherein the backrest comprises a headrest that is foldable between an extended position and a retracted position.

4. The aircraft of claim 1, wherein the backrest comprises a headrest that is configured to telescope between an extended position and a retracted position.

5. The aircraft of claim 1, wherein the rear surface in the second position is flat in relation to a floor of the internal cabin.

6. A seat assembly for an internal cabin of a vehicle, the seat assembly comprising:
a seat cushion;
a backrest pivotally coupled to the seat cushion, the backrest moveable between a first position and a second position, wherein the first position is configured to allow a passenger to sit on the seat cushion, and wherein the second position is configured to allow one or more cargo items to be secured on a rear surface of the backrest, and wherein the rear surface of the backrest comprises (a) a recessed area configured to receive a portion of another seat assembly, and (b) one or more tie down couplers;
one or more securing rails secured to one or more sides of one or both of the seat cushion or the backrest; and
one or more armrests pivotally coupled to one or both of the seat cushion or the backrest, wherein the one or more armrests are configured to be pivoted behind the rear surface to provide lateral support for the one or more cargo items when the backrest is in the second position.

7. The seating assembly of claim 6, wherein the vehicle is an aircraft.

8. The seat assembly of claim 6, wherein the backrest is configured to be folded over and onto the seat cushion in the second position.

9. The seat assembly of claim 6, wherein the rear surface in the second position is flat in relation to a floor of the internal cabin.

10. The seat assembly of claim 6, further comprising one or more covers that are configured to removably secure to the one or more tie down couplers.

11. The seat assembly of claim 6, wherein the backrest comprises a headrest that is foldable between an extended position and a retracted position.

12. The seat assembly of claim 6, wherein the backrest comprises a headrest that is configured to telescope between an extended position and a retracted position.

13. A method comprising:
moving a backrest of a seat assembly within an internal cabin of a vehicle between a first position and a second position, wherein the backrest is pivotally coupled to a seat cushion;
allowing a passenger to sit on the seat cushion when the backrest is in the first position;
allowing one or more cargo items to be secured on a rear surface of the backrest when the backrest is in the second position;
receiving a portion of another seat assembly within a recessed area of the rear surface of the backrest when the backrest is in the second position;
pivoting one or more armrests behind the rear surface to provide lateral support for the one or more cargo items when the backrest is in the second position;

securing one or more straps to one or more tie down couplers on or within the rear surface of the backrest; and securing a cargo net to one or more securing rails secured to one or more sides of one or both of the seat cushion or the backrest.

14. The method of claim 13, wherein the vehicle is an aircraft.

15. The method of claim 13, wherein said moving comprises folding the backrest over and onto the seat cushion in the second position.

16. The method of claim 13, wherein the rear surface in the second position is flat in relation to a floor of the internal cabin.

17. The method of claim 13, further comprising removably securing one or more covers to the one or more tie down couplers.

18. The method of claim 13, further comprising moving a headrest of the backrest between an extended position and a retracted position.

19. The method of claim 18, wherein said moving the headrest comprises folding the headrest between the extended position and the retracted position.

20. The method of claim 18, wherein said moving the headrest comprises telescoping the headrest between an extended position and a retracted position.

* * * * *